(12) United States Patent
Yeary et al.

(10) Patent No.: US 8,274,425 B2
(45) Date of Patent: Sep. 25, 2012

(54) SINGLE CHANNEL SEMI-ACTIVE RADAR SEEKER

(75) Inventors: Mark B. Yeary, Krum, TX (US); James R. Toplicar, Plano, TX (US); Paul E. Doucette, Plano, TX (US); Eleanor Foltz, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/981,401

(22) Filed: Dec. 29, 2010

(65) Prior Publication Data

US 2012/0169524 A1 Jul. 5, 2012

(51) Int. Cl.
    *G01S 13/72* (2006.01)
(52) U.S. Cl. ............... 342/62; 342/77; 342/80; 342/97; 342/140; 342/141; 342/149
(58) Field of Classification Search .............. 342/62, 342/74–77, 80–81, 85, 90, 95–97, 125–126, 342/131–135, 139–141, 147–154, 156–158
See application file for complete search history.

(56) References Cited

U.S. PATENT DOCUMENTS

| | | | | |
|---|---|---|---|---|
| 3,760,420 A * | 9/1973 | Hadad et al. | .................. | 342/425 |
| 3,832,711 A * | 8/1974 | Grant et al. | .................. | 244/3.19 |
| 3,970,269 A * | 7/1976 | Conforti | .................. | 244/3.16 |
| 4,030,686 A * | 6/1977 | Buchman | .................. | 244/3.13 |
| 4,072,861 A * | 2/1978 | Couderc et al. | .................. | 250/233 |
| 4,589,610 A * | 5/1986 | Schmidt | .................. | 244/3.19 |
| 4,991,794 A * | 2/1991 | Benson et al. | .................. | 244/3.15 |
| 5,014,064 A * | 5/1991 | Spencer et al. | .................. | 342/152 |
| 5,059,968 A * | 10/1991 | Thompson et al. | .................. | 342/152 |
| 5,201,895 A * | 4/1993 | Grosso | .................. | 244/3.16 |
| 5,225,838 A * | 7/1993 | Kanter et al. | .................. | 342/61 |
| 5,245,347 A * | 9/1993 | Bonta et al. | .................. | 342/149 |
| 5,629,705 A * | 5/1997 | Spettel et al. | .................. | 342/62 |
| 5,696,347 A * | 12/1997 | Sebeny et al. | .................. | 102/214 |
| 5,982,329 A * | 11/1999 | Pittman et al. | .................. | 343/700 MS |
| 5,990,834 A * | 11/1999 | Barrick et al. | .................. | 342/418 |
| 6,400,306 B1 * | 6/2002 | Nohara et al. | .................. | 342/25 R |
| 6,670,918 B2 * | 12/2003 | Guiraud et al. | .................. | 342/377 |
| 6,771,218 B1 * | 8/2004 | Lalezari et al. | .................. | 342/373 |
| 7,079,588 B1 * | 7/2006 | Doucette et al. | .................. | 375/295 |
| 7,183,966 B1 * | 2/2007 | Schramek et al. | .................. | 342/53 |
| 7,277,046 B2 * | 10/2007 | Adams et al. | .................. | 342/147 |
| 2002/0097184 A1 * | 7/2002 | Mayersak | .................. | 342/458 |
| 2004/0056814 A1 * | 3/2004 | Park et al. | .................. | 343/771 |
| 2005/0012655 A1 * | 1/2005 | Lalezari et al. | .................. | 342/62 |
| 2007/0018884 A1 * | 1/2007 | Adams et al. | .................. | 342/147 |
| 2010/0012765 A1 * | 1/2010 | Solenne | .................. | 244/3.16 |

FOREIGN PATENT DOCUMENTS

DE 3636630 C1 * 4/1988
JP 02102474 A * 4/1990

* cited by examiner

*Primary Examiner* — John B Sotomayor
(74) *Attorney, Agent, or Firm* — Christie, Parker & Hale, LLP (57) ABSTRACT

The disclosed approach provides a low-cost approach by employing a single channel receiver for a direction-finding missile, rather than a conventional four-channel system. It employs interferometry techniques. The proposed approach leverages orthogonal waveforms and pseudorandom noise (PN) codes. This is a low-cost approach for a single channel direction finding system by leveraging orthogonal waveforms and interferometric techniques.

11 Claims, 8 Drawing Sheets

$$V(\theta,\phi) = \begin{bmatrix} 1 \\ e^{j\frac{2\pi d \sin(\theta)}{\lambda}} \\ e^{j\frac{2\pi d \cos(\theta)\sin(\phi)}{\lambda}} \\ e^{j\frac{2\pi d [\cos(\theta)\sin(\phi) + \sin(\theta)]}{\lambda}} \end{bmatrix}$$

SINGLE CHANNEL SEMI-ACTIVE RADAR SEEKER

BACKGROUND

1. Technical Field

The disclosed technology relates to radio frequency (RF) receiver architectures, waveforms, and algorithms for signal processing. More specifically, the disclosed technology relates to RF receiver architectures and algorithms for signal processing as applied to semi-active missile guidance.

2. Brief Description of the Related Art

An incoming missile or other threat can be thwarted with an interceptor missile (or interceptor), which is a high-speed defensive missile designed to take out the incoming (target) missile before the target missile can reach its intended destination. An important class of interceptor uses RF radar signals to provide the guidance information needed to intercept the moving target. Semi-Active radar seekers receive the target radar return from RF signals transmitted by an illumination radar residing at some fixed location. Radar seekers in the interceptors typically employ multiple RF channels to receive and process the radar returns from the target. The interceptor seeker derives an intercept guidance solution from the range, range rate, direction angle, and angle rate from measurements generated by the radar return.

For example, a current active protection system (APS) long-range guided interceptor uses a multi-channel (four-channel) radio frequency (RF) seeker for intercept. Such systems typically require four antenna elements to estimate the target bearing by measuring the angle of arrival of the target RF return. Interferometer or monopulse processing is used to determine the angle of arrival by comparing the relative RF phase difference of the signals received in each of the four channels.

A standard monopulse seeker typically uses a conventional pulsed radar waveform, with multiple receive elements and multiple RF/intermediate frequency (IF) receiver channels. Accurate angle of arrival measurements demand that these receive channels must be matched in amplitude and phase. In addition, the phase of arrival can be distorted by the presence of aerodynamic radomes used in high-speed interceptors. These distortions must be measured and corrected using calibration and compensation techniques. Thus, to meet accuracy and timing requirements of interceptor missile seekers, phase balance is required, amplitude balance is required, and fast, accurate calibration is required. These requirements can be difficult to achieve in a small low-cost, expendable, seeker design.

SUMMARY

To address the above problems, embodiments of the present invention provide a low-cost approach by employing a single channel receiver for a direction-finding missile, rather than a conventional four-channel system. These embodiments employ new signal measurement techniques that move the requirements for a precisely calibrated, multi-channel architecture from the expendable interceptor to an external signal generator or illumination source (the "illuminator"), for example, the illumination radar (fire control radar) on the interceptor's launch platform. That is, embodiments of this invention "invert" the role of interferometric processing by using the phase difference progression of the transmit signals rather than the receive signals to determine the angle of arrival. Such a reversal does not change the signal path geometry, only the physical implementation on the sending and receiving ends.

The disclosed embodiments accomplish this inversion by using coherent orthogonal transmitted waveforms and special processing in the interceptor seeker to extract the transmit phase information from the received orthogonal waveforms. This is a low-cost approach for a single channel direction finding system by using orthogonal waveforms and interferometric techniques in place of multiple antennas and channels receiving a single waveform.

In an exemplary embodiment according to the present invention, the illumination radar uses an antenna segmented into four subarrays to transmit four orthogonal coded, coherent RF radar waveforms. These waveforms are orthogonal in the sense that they have a cross correlation equal to zero. For example, this exemplary embodiment can be implemented using orthogonal waveforms generated using Walsh Modulated pseudo-noise sequences. However, the invention is not limited thereto, and can be implemented using any of many methods for generating waveforms with a comparable cross correlation property, as would be apparent to one of ordinary skill in the art. In similar fashion, other details of the transmitted waveforms, such as frequency, pulse repetition frequency, duty, etc., can also be varied and still fall within the scope of the present invention.

The transmitted waveforms illuminate both the incoming threat and the outgoing interceptor. Relative RF phase shifts are imparted to the four illumination waveforms at the incoming threat due to the difference in path length from the transmit phase centers to the threat position. The threat angular position in the illumination beam uniquely determines the phase progression imparted to the four illumination waveforms upon reflection from the target. A different phase progression is observed by the interceptor receiving the direct path signal, which is uniquely determined by the interceptor's angular position in the illumination beam.

The single channel seeker in the interceptor processes both the direct path and reflected path signals. This processing includes a digital correlator, which correlates the received illumination against the known transmitted waveform references and segregates the signal contributions from the four received orthogonal waveforms. The output of this digital correlator contains the phase progression information for the incoming threat and the interceptor. The four correlator outputs are also coherently combined and input to a conventional range/Doppler processor for the purpose of target detection and measurement parameter extraction.

The range/Doppler processor detects and resolves the direct path signals from the reflected path signals in the range and Doppler shift dimensions. The time difference of arrival between the direct path and reflected path measures the range difference between the illumination radar, the interceptor, and the incoming threat. The Doppler difference between the direct and reflected path measures the rate of change of the range difference. The phase progression for the direct path signals and those for the reflected path signals at the range/Doppler locations measure the angular positions of both the interceptor and threat. The interceptor guidance computer uses the range, range rate, and angle measurements to fly an intercept course to the incoming threat.

According to an exemplary embodiment of the present invention, a seeker is provided. The seeker includes a single channel radio frequency (RF) receiver and a processor. The RF receiver is configured to receive a plurality of signals from a respective plurality of transmitting sources, both directly from the transmitting sources and indirectly from reflections off a target. The plurality of signals includes mutually orthogonal transmitted waveforms. The processor is configured to separate the plurality of directly transmitted signals to track the seeker's location relative to the transmitting sources, and to separate the plurality of reflected signals to track the target's location and motion relative to the seeker.

A number of the plurality of signals may be four.

The plurality of signals may be synchronized to a common clock.

The plurality of signals may be modulated using Walsh sequences.

The plurality of signals may be modulated using a pseudo-random noise sequence.

The seeker may be configured to guide an interceptor to the target.

The interceptor may include the seeker.

According to another exemplary embodiment of the present invention, an interceptor is provided. The interceptor is for intercepting a target from a launch platform. The launch platform includes a plurality of transmitting sources. The interceptor includes a single antenna element and a seeker. The antenna element is for receiving a plurality of signals from the respective plurality of transmitting sources, both directly from the transmitting sources and indirectly from reflections off the target. The plurality of signals includes mutually orthogonal transmitted waveforms. The seeker includes a single channel radio frequency (RF) receiver and a processor. The RF receiver is configured to process the plurality of signals from the antenna element. The processor is configured to separate the plurality of directly transmitted signals to track the seeker's location relative to the transmitting sources, and to separate the plurality of reflected signals to track the target's location and motion relative to the seeker.

A number of the plurality of signals may be four.

According to yet another exemplary embodiment of the present invention, a method of tracking a target by a seeker is provided. The seeker includes a single channel radio frequency (RF) receiver. The method includes: receiving a plurality of signals from a respective plurality of transmitting sources, both directly from the transmitting sources and indirectly from reflections off the target; separating the plurality of directly transmitted signals to track the seeker's location relative to the transmitting sources; and separating the plurality of reflected signals to track the target's location and motion relative to the seeker. The plurality of signals includes mutually orthogonal transmitted waveforms.

A number of the plurality of signals may be four.

BRIEF DESCRIPTION OF THE DRAWINGS

The accompanying drawings illustrate exemplary embodiments of the present invention, and together with the description, serve to explain aspects of the embodiments.

FIG. 1A is an illustration of a seeker receiver/processor architecture for a comparable, four-channel RF missile seeker embodiment, while

DETAILED DESCRIPTION

Exemplary embodiments of the present invention will now be described in more detail with reference to the accompanying drawings. In the drawings, like reference numerals refer to similar or like structures throughout.

The disclosed embodiments exploit properties of orthogonal waveforms (e.g., mutually orthogonal or pairwise orthogonal waveforms), namely that such waveforms are mutually transparent and non-interfering. These properties allow the extraction of information from an individual waveform from a composite signal that includes multiple orthogonal waveforms. Such waveforms are commonly used in communications systems and methods of generating and demodulating are well known by those of ordinary skill in the art.

For example, some embodiments of the present invention use the orthogonal properties of traditional Pseudo Noise (PN) sequences that have been modulated using Walsh sequences. These are sequences of $2^m$ values (for some positive integer m) expressed as +1's and −1's. The inner product of each of these PN sequences with itself has a value of exactly $2^m$, while inner products with other sequences are zero. This inner product feature manifests itself at the peak of the auto-correlation and cross-correlation sequences. This set of PN sequences have the cross correlation properties that enable them to encode multiple non-interfering signals on the same channel. However, the invention is not limited to Walsh sequences. Any set of orthogonal waveforms meeting these cross correlation properties can be used.

Exemplary embodiments described herein use pseudo-random codes modulated by independent Walsh functions to provide code division separation between the received codes in the four receiver channels. Outputs of the four code channels are coherently summed to provide detection, relative range measurements, and relative range rate measurements. The relative phase between the individual channels provides target and interceptor angle information. Processing of both direct path and reflected path signal provide the differential, range, range rate, and angle information required to intercept the threat.

System Overview

Figure 1A:
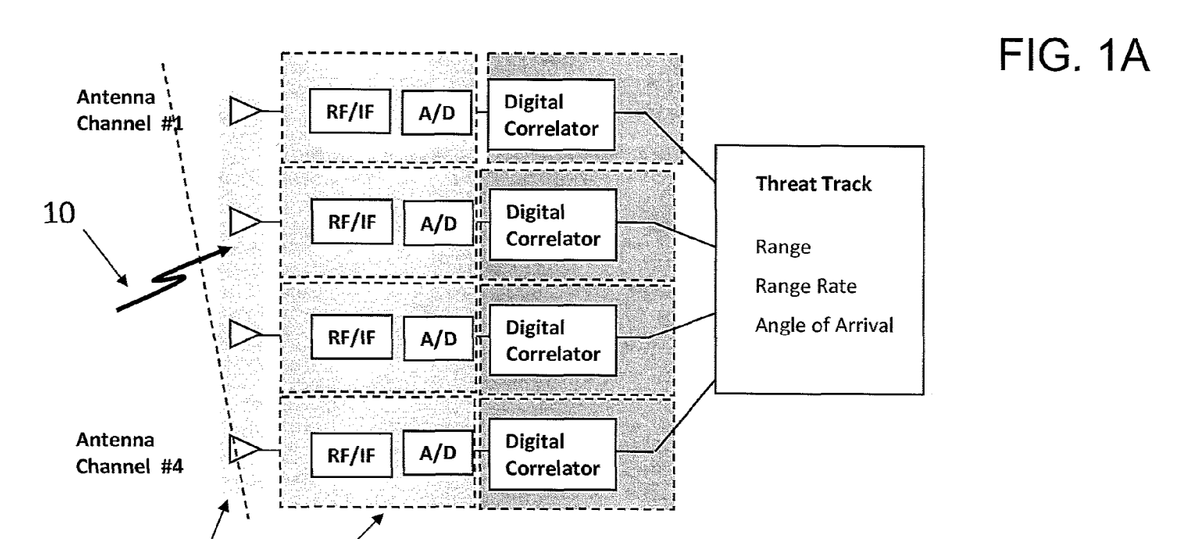
Figure 1B:
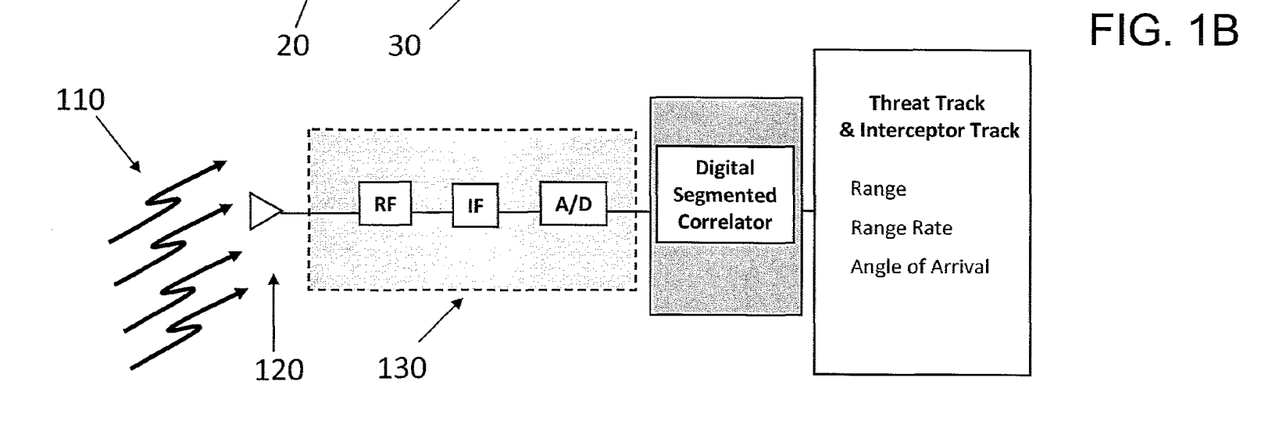
FIG. 1B is an illustration of a seeker receiver/processor architecture according to an embodiment of the present invention.

FIGS. 1A and 1B show some of the complexity differences between receiver architectures. FIG. 1A is an illustration of a seeker receiver/processor architecture for a comparable, four-channel RF missile seeker embodiment, while FIG. 1B is an illustration of a seeker receiver/processor architecture according to an embodiment of the present invention. As can be seen in FIG. 1A, in the four-channel embodiment, a single pulsed radar waveform 10 is received by four separate antenna channels 20 and their associated processing hardware 30 (e.g., signal converters and correlators). In contrast, in FIG. 1B, for the exemplary seeker receiver/processor architecture embodiment of the present invention, four separate orthogonal waveforms 110 are received by a single antenna channel 120 and its associated processing hardware 130. That is, much of the receiver hardware in the embodiment of FIG. 1B has been reduced by a factor of four from that of the embodiment of FIG. 1A.

Embodiments of the disclosed interceptor use a single channel RF receiver. Such a design has several benefits when compared to a multiple channel, multiple receiver approach. For example, the single receiver approach is not affected by phase perturbations from distortions due to the interceptor radome. This receiver operates without extended warm-up or calibration, which improves the engagement timeline. It also moves complexity from the (expendable) interceptor seeker to the illuminator and corresponding illumination waveform, thus reducing interceptor cost while maintaining guidance accuracy. Further, it reduces size and weight of the interceptor, which has significant size, power, weight, cost, timeline, and environmental requirements to function for its intended purpose. The single channel interceptor uses new orthogonal and separable waveforms, a single antenna element, a single RF/IF channel (thus, no phase balancing is required and no amplitude balancing is required), and digital processing to separate and resolve the orthogonal waveforms.

In addition, since the transmitted signal of embodiments of the present invention is composed of overlapped independent waveforms, the signal appears noise-like. This gives the waveform a low probability of detection (LPD) and low probability of intercept (LPI) characteristic not found in the conventional radar waveform. It also affords protection against targets employing angle deception jamming techniques to deny accurate angle of arrival information to the interceptor. A target using such techniques typically have the capability to receive the interceptor radar signals and then retransmit these signals at a location "off board" the target platform using a towed decoy or terrain bounce approach.

Other angle deception techniques involve retransmitting the signal in a way to cause a wave front distortion at the interceptor or to change the polarization of the retransmitted signal challenge receiver calibration in the interceptor. Embodiments of the present invention have a high level of immunity to these angle deception techniques. The phase progression imparted to the waveform is characteristic of the point at which the target received the signals, so the "off board" transmission does not change the angle of arrival information to the target. Further, the single channel receiver does not determine the angle of arrival from the received wave front angle, so embodiments of the present invention are not degraded by wave front distortion or polarization techniques.

Exemplary Embodiments

Figure 2:
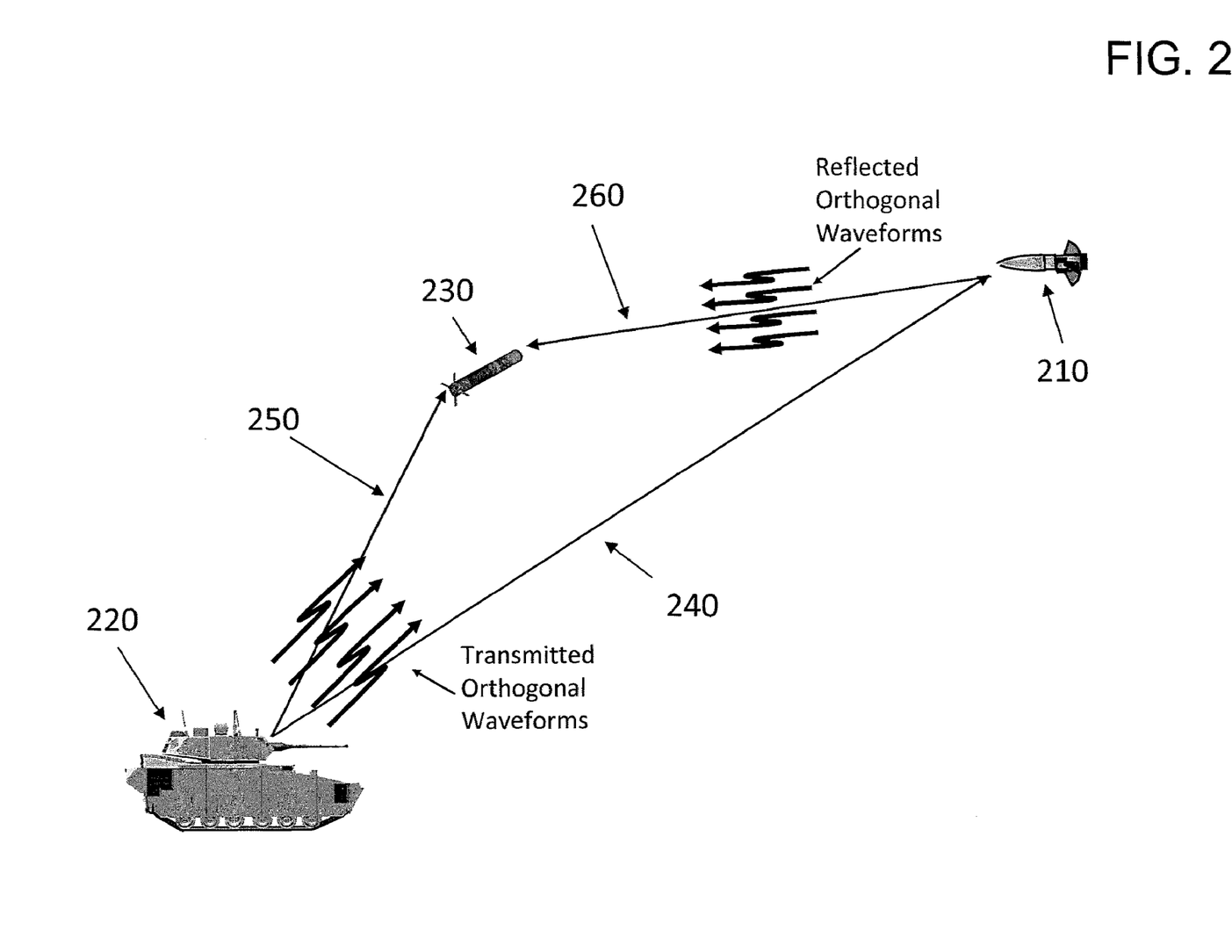
FIG. 2 is an illustration of a side (elevation) view of a target missile, interceptor missile, and interceptor launch/guidance platform with corresponding signal paths according to an embodiment.
Figure 3:
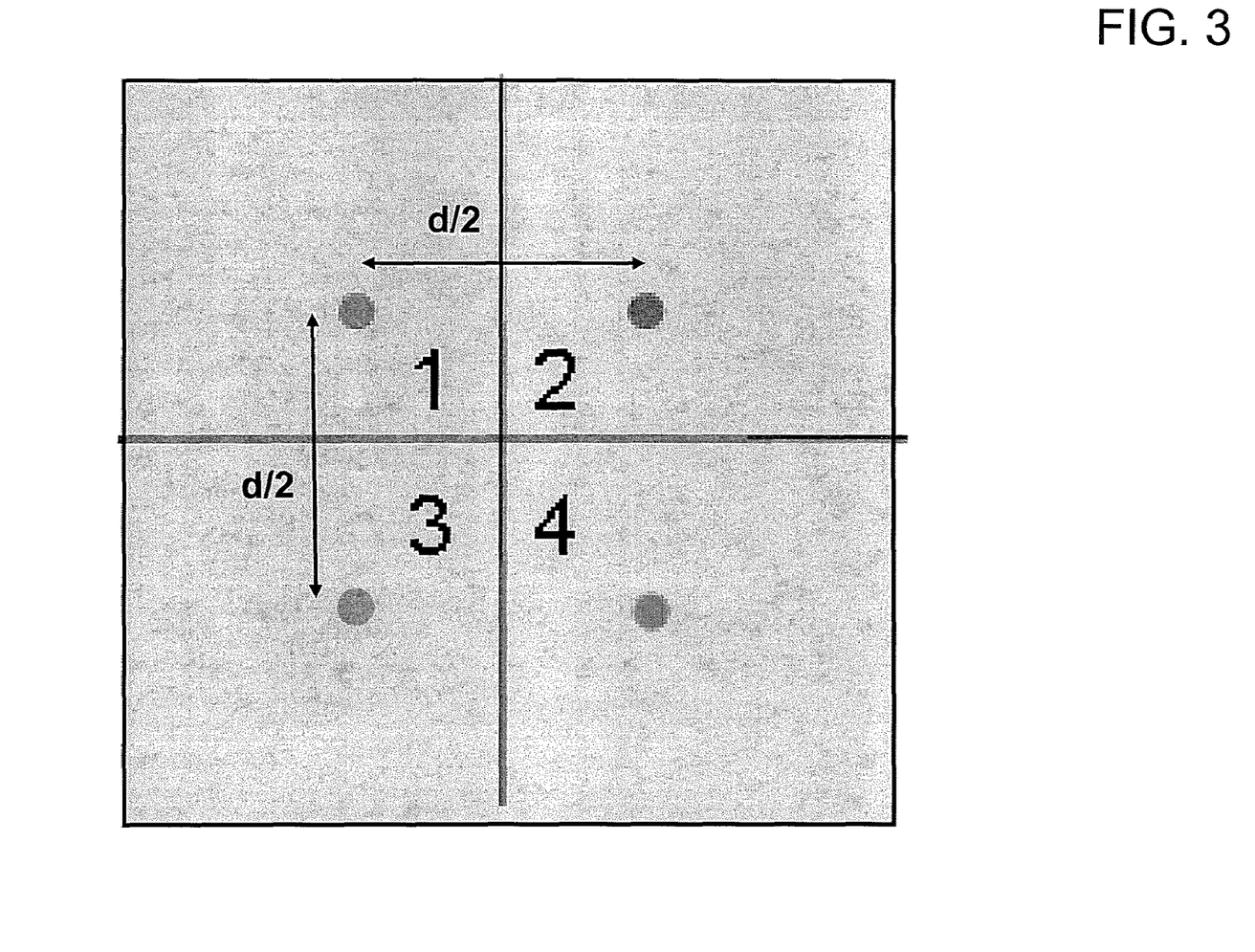
FIG. 3 is an illustration showing the locations of the antenna phase centers of radar quadrants used for transmitting orthogonal waveforms according to an embodiment.
Figure 4:
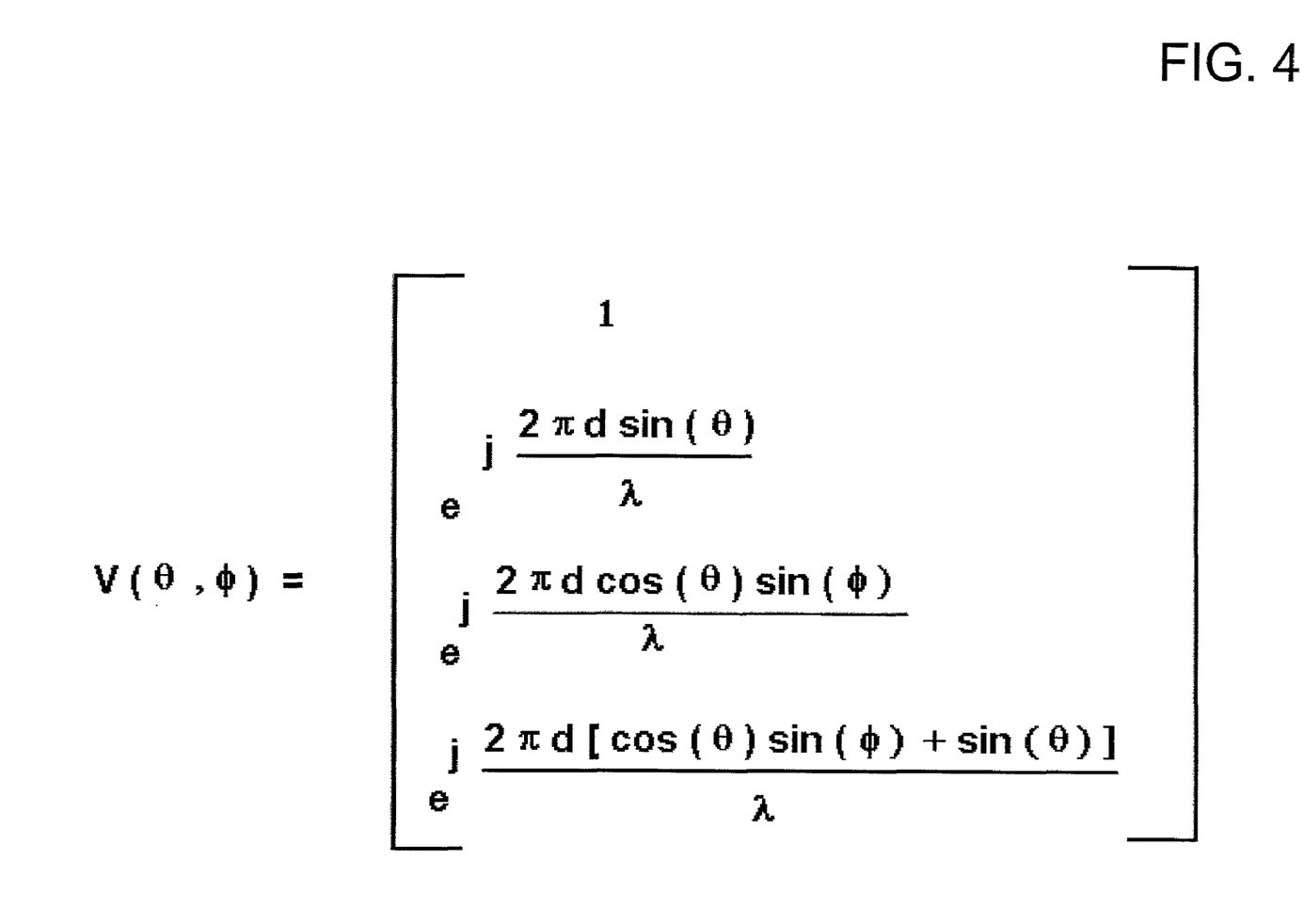
FIG. 4 is an illustration of a vector representation of received target phase progression indicated angular positions in azimuth and elevation coordinated according to an embodiment.
Figure 5:
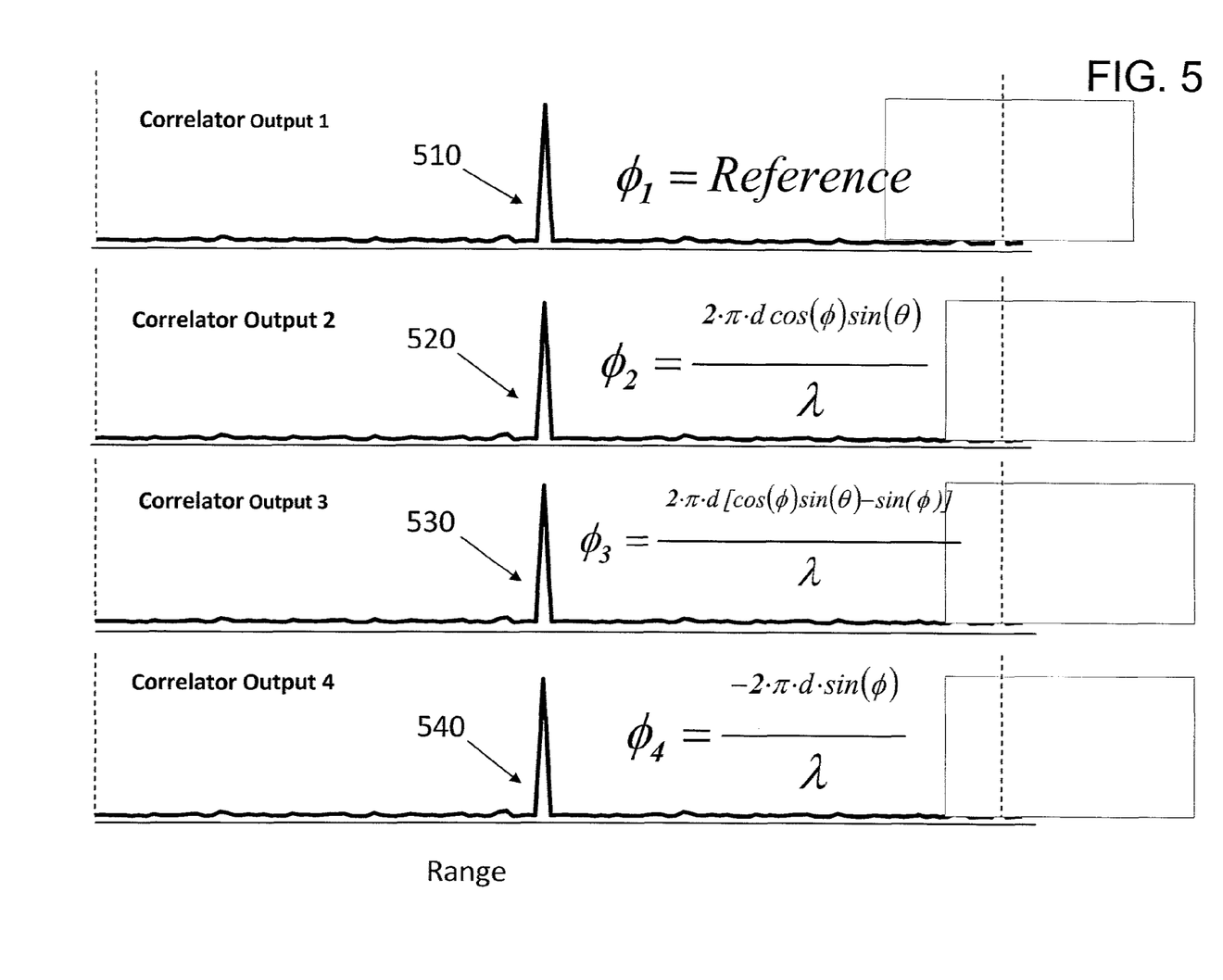
FIG. 5 is a graphical representation of four different digitally processed orthogonal waveforms showing a target phase progression according to an embodiment.
Figure 6A:
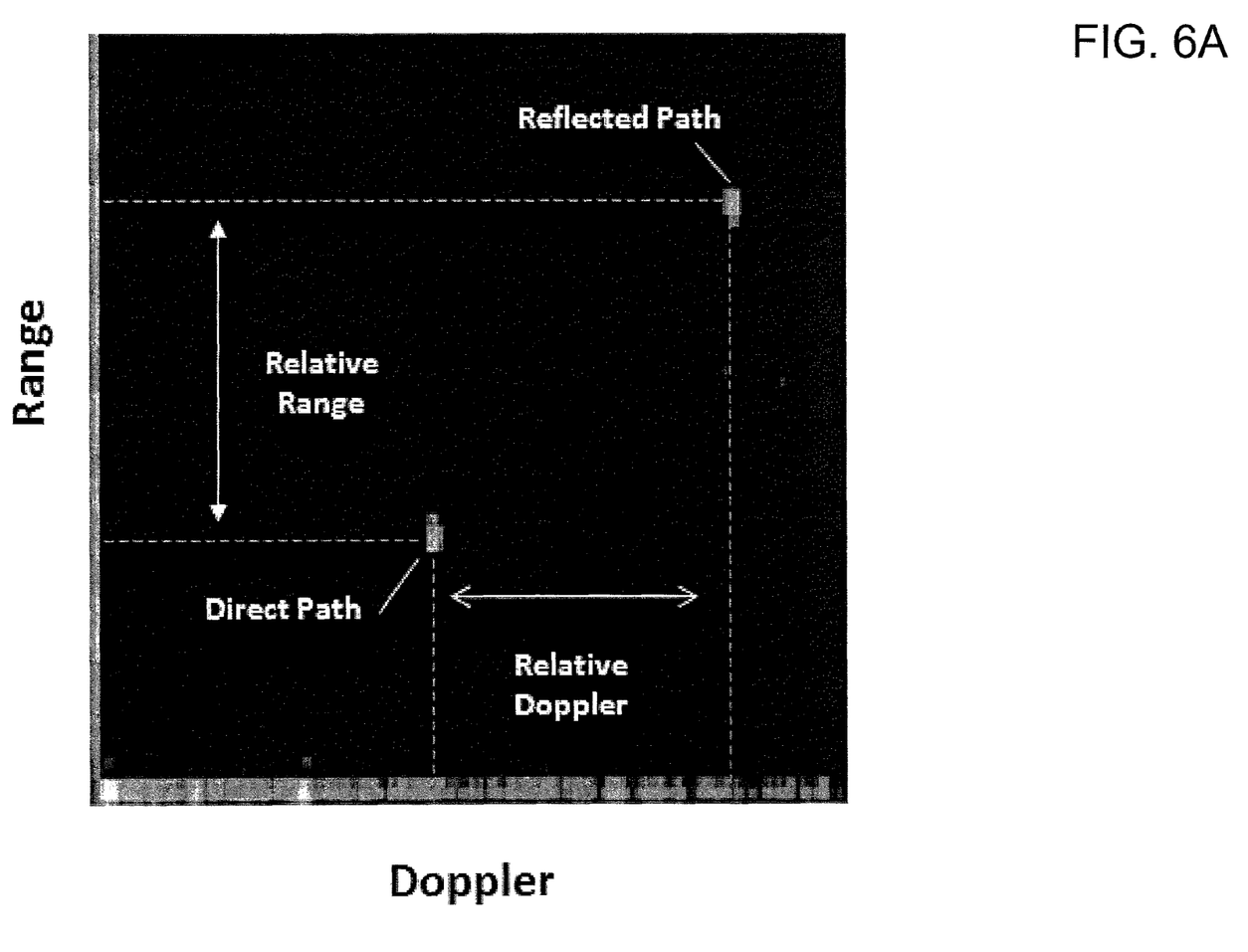
FIGS. 6A and 6B are graphical representations of the radar seeker range/Doppler processor output for the direct path and reflected path signals used to measure relative range and Doppler according to an embodiment.
Figure 6B:
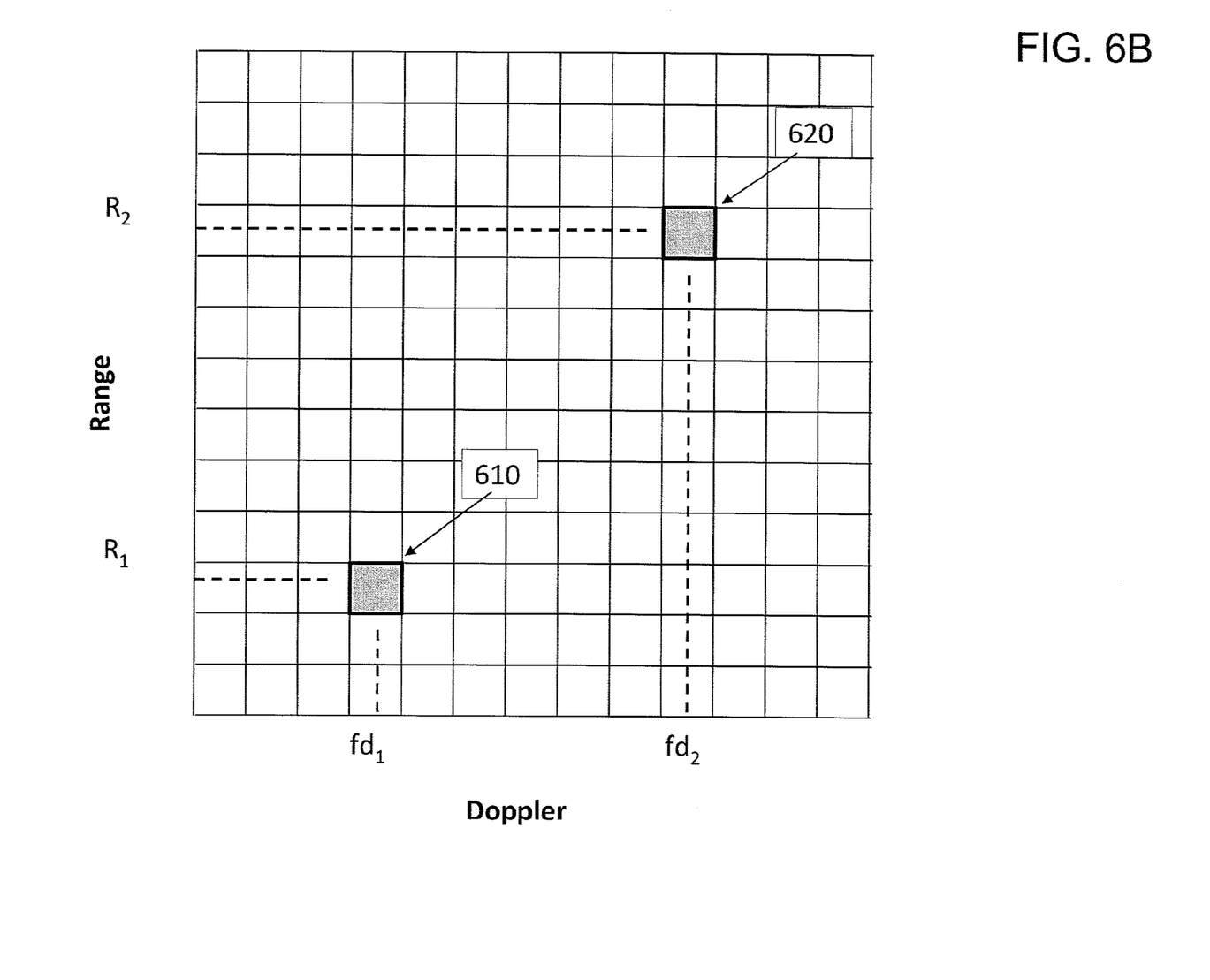
Figure 7:
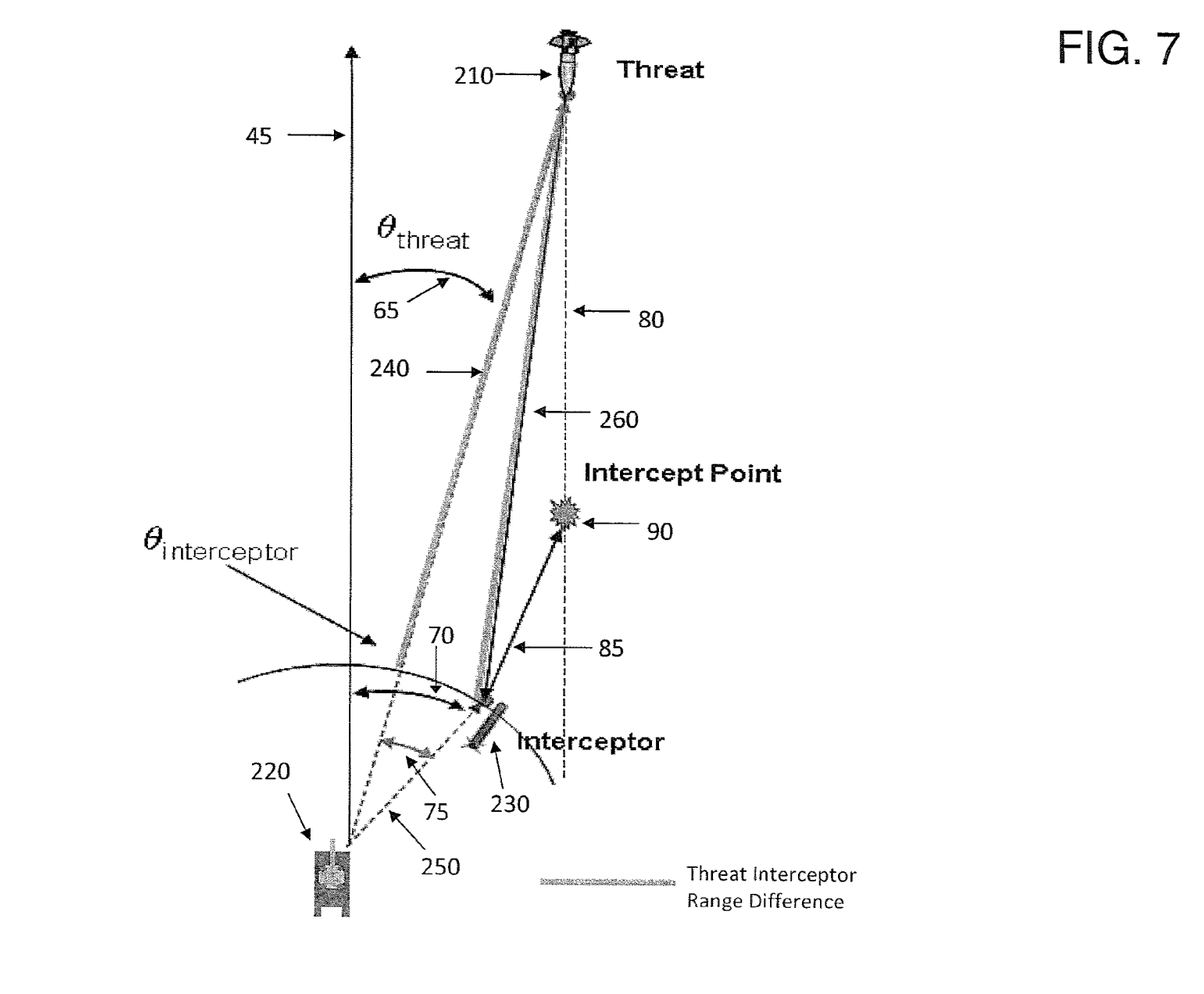
FIG. 7 is an illustration of a top (azimuth) view of a target missile, interceptor missile, and interceptor launch/guidance platform showing how the single channel seeker angle and range measurements map into the interceptor engagement geometry according to an embodiment.

FIG. 2 is an illustration of a side (elevation) view of a target missile, interceptor missile, and interceptor launch/guidance platform with corresponding signal paths according to an embodiment. FIG. 3 is an illustration of radar quadrants for transmitting orthogonal waveforms according to an embodiment. FIG. 4 is an illustration of a vector representation of received phase progression indicated angular positions according to an embodiment. FIG. 5 is a graphical representation of four different digitally processed waveforms showing a target phase progression according to an embodiment. FIGS. 6A and 6B are graphical representations of the radar seeker range/Doppler processor output for the direct path and reflected path signals used to measure relative range and Doppler according to an embodiment. FIG. 6A illustrates how the signals might display on a screen in an exemplary embodiment while FIG. 6B highlights the important information being displayed on the screen shot of FIG. 6B. FIG. 7 is an illustration of a top (azimuth) view of a target missile, interceptor missile, and interceptor launch/guidance platform with signal paths corresponding to the angle and range measurements according to an embodiment.

Referring to FIG. 2, an incoming missile 210 is the threat. The threat does not necessarily have to be a missile. For instance, it may be a bomb, a projectile, an aircraft, that is, anything capable of being tracked and intercepted. A launch/guidance platform 220 (perhaps the intended target of the incoming missile 210) reacts by deploying an interceptor missile 230 to destroy the incoming (target) missile 210. The incoming missile 210 can thus be referred to as the target 210 (or threat 210), while the interceptor missile 230 can be referred to as the interceptor 230.

To assist the interceptor 230 in reaching the target 210, the launch/guidance platform 220 concurrently (for example, simultaneously) transmits orthogonal waveform signals 240 and 250 outward at both the target 210 and the interceptor 230, respectively. For example, the launch/guidance platform 220 may transmit four such orthogonal signals, one per radar quadrant, to reach both the target 210 and the interceptor 230. The transmitted orthogonal waveforms 240 directed towards the target 210 then some portion of the orthogonal waveforms reflect off the target 210 towards the interceptor 230 in the form of reflected orthogonal waveforms 260. The interceptor 230 employs a seeker (internal) to search for and home in on the target 210 by using a receiver to receive the transmitted (direct path) orthogonal waveforms 250 from the launch/guidance platform 220 and the reflected orthogonal waveforms 260 from the target 210. The seeker correlates these transmitted and reflected waveforms 250 and 260 that it receives, which allows the seeker (and thus, the interceptor 230) to determine its location relative to the target 210, and to guide the interceptor 230 accordingly.

Referring to FIG. 3, four radar quadrants are depicted, from which different orthogonal coded waveforms are concurrently (for example, simultaneously) transmitted to enable the seeker guide the interceptor 230 to the target 210. Each of the four radar array quadrants transmits one of the four orthogonal waveforms. The phase of the received waveforms 250 and 260, transmitted from each radar quadrant, uniquely define an azimuth and elevation in the mainbeam of the radar. The interceptor's angular position in the mainbeam can thus be determined by measuring this quadrant phase progression in the received waveforms 250, while the target's angular position in the mainbeam can be determined by measuring this quadrant phase progression in the received waveforms 260. The phase differences thus indicate the target angle.

Referring to FIG. 4, correlation processing in a single channel seeker is then used to measure the phase difference between the orthogonal waveforms. Here, $\lambda$ refers to the wavelength of the transmitted signals, $\theta$ refers to the angle in one plane (for example, azimuth) made by the target to the boresight of the transmitter, and $\phi$ refers to the angle in another plane (for example, elevation) made by the target to the boresight of the transmitter. The parameter, d, is a measure of the size of the transmitting antenna.

The interceptor receiver uses the correlation processing to separate the orthogonal received signals. See, for example, FIG. 5, which shows four example digitally processed waveforms 510, 520, 530, and 540 as received by the interceptor's receiver when reflected off the target 210. The reflected path received waveforms 260 indicate the angular position of the target 210, while the direct path received waveforms 250 indicate the angular position of the interceptor.

Time and Doppler differences can then be used to determine the relative range and range rate between the target 210 and the interceptor 230. See, for example, FIGS. 6A and 6B, showing a range/Doppler matrix, created using the combined correlator outputs with the locations of the direct signal 610 and reflected signal 620. The direct and reflected signals 250 and 260 measure the relative range and Doppler. The seeker, thus, employs a hybrid approach to this radar signal processing, combining both direct and reflected signals to determine relative locations and rates of change.

FIG. 7 shows a representation of these measurements from this process from an azimuth perspective. Many of the features in FIG. 7 are similar to those in FIG. 2, so maintain the same reference numerals. Their descriptions will not be repeated. The launch/guidance platform 220 directs its radar mainbeam toward the threat 210 in the forward direction with respect to the bearing reference 45. The portion 40 that reaches the target 210 makes an angle 65, also denoted $\theta_{threat}$, with respect to the bearing reference 45, while the portion 250 that reaches the interceptor 230 makes an angle 70, also denoted $\theta_{interceptor}$, with respect to the bearing reference 45. Further, the portion 260 that reflects off the target 210 towards the interceptor 230 makes an angle 75, namely the difference $$\theta_{interceptor} - \theta_{threat}$$

between interceptor angle 70 and target angle 65.

Over time, the seeker in the interceptor 230 can use the reflected path phase progression to measure the threat's angular position, $\theta_{threat}$. In addition, the seeker can use the direct path phase progression to measure the interceptor's angular position with respect to the bearing reference, $\theta_{interceptor}$. Then, the time of arrival difference between reflected and direct path signals measures the range to go for the interceptor 230 to intercept the target 210, while the Doppler difference between the reflected and direct path signals 260 and 250 measures the closing range rate. Finally, the ratio of the range to go and the closing rate measures the time until the interceptor 230 intercepts the target 210. Using this information, the seeker can determine the anticipated path 80 of the target 210 and guide the interceptor 230 along the intercept path 85 to reach the target 210 at a point 90 where the target's path 80 intersects the interceptor's path 85 at the same time.

CONCLUSIONS

Embodiments of the present invention simplify the guidance system of the interceptor by leveraging new signal processing algorithms for use on existing low-cost hardware. To facilitate the design, the system is made possible by a simplified receiver architecture and by the novel design of waveforms that exhibit appropriate channel separation. A four-channel interferometer system is proposed in an exemplary embodiment. The four orthogonal waveforms are transmitted via four antenna phase centers, strike a target, and the re-radiated echoes are received by a single receiver that can demodulate the signals and determine the angular difference of this interferometric system.

Although certain exemplary embodiments of the present invention have been disclosed for illustrative purposes, those skilled in the art will appreciate that various modifications, additions and substitutions are possible, without departing from the scope and spirit of the invention as disclosed in the accompanying claims, and equivalents thereof.

What is claimed is:

1. A seeker comprising:
a single channel radio frequency (RF) receiver configured to convert a plurality of transmitted signals received by a single receiving antenna element into a corresponding plurality of received signals, the plurality of transmitted signals comprising mutually orthogonal transmitted waveforms from a corresponding plurality of spatially separated transmitting sources, each of the plurality of transmitted signals being received by the single receiving antenna element both directly from a respective one of the transmitting sources and indirectly from reflections off a target, the plurality of received signals comprising a corresponding plurality of received directly transmitted signals and a corresponding plurality of received reflected signals; and
a processor configured
to separate the plurality of received directly transmitted signals to track the seeker's location and motion relative to the transmitting sources, and
to separate the plurality of received reflected signals to track the target's location and motion relative to the seeker.

2. The seeker of claim 1, wherein a number of the plurality of transmitted signals is four.

3. The seeker of claim 1, further comprising a digital correlator for correlating each of the plurality of received signals whose corresponding said transmitted signals are synchronized to a common clock of the plurality of spatially separated transmitting sources.

4. The seeker of claim 1, further comprising a digital correlator for correlating each of the plurality of received signals against known Walsh sequences to segregate the received signals into corresponding contributions from each of the plurality of transmitted signals.

5. The seeker of claim 1, further comprising a digital correlator for correlating each of the plurality of received signals against a known pseudorandom noise sequence to segregate the received signals into corresponding contributions from each of the plurality of transmitted signals.

6. The seeker of claim 1, wherein the processor is further configured to communicate the tracked location and motion information to a guidance computer of an interceptor to allow the guidance computer to guide the interceptor to the target.

7. An interceptor comprising the seeker of claim 1.

8. An interceptor for intercepting a target from a launch platform comprising a plurality of spatially separated transmitting sources, the interceptor comprising:
a single receiving antenna element for receiving a corresponding plurality of transmitted signals from the plurality of spatially separated transmitting sources, the plurality of transmitted signals comprising mutually orthogonal transmitted waveforms, each of the plurality of transmitted signals being received by the single receiving antenna element both directly from a respective one of the transmitting sources and indirectly from reflections off the target; and
a seeker comprising:
a single channel radio frequency (RF) receiver configured to convert the plurality of transmitted signals received by the single receiving antenna element into a corresponding plurality of received directly transmitted signals and a corresponding plurality of received reflected signals; and a processor configured
- to separate the plurality of received directly transmitted signals to track the seeker's location and motion relative to the transmitting sources, and
- to separate the plurality of received reflected signals to track the target's location and motion relative to the seeker.

9. The interceptor of claim 8, wherein a number of the plurality of transmitted signals is four.

10. A method of tracking a target by a seeker comprising a single channel radio frequency (RF) receiver connected to a single receiving antenna element, the method comprising:

receiving a plurality of transmitted signals by the single receiving antenna element, the plurality of transmitted signals comprising mutually orthogonal transmitted waveforms from a corresponding plurality of spatially separated transmitting sources, each of the plurality of transmitted signals being received by the single receiving antenna element both directly from a respective one of the transmitting sources and indirectly from reflections off the target;

converting by the single channel RF receiver the plurality of transmitted signals into a corresponding plurality of received directly transmitted signals and a corresponding plurality of received reflected signals;

separating the plurality of received directly transmitted signals to track the seeker's location and motion relative to the transmitting sources; and separating the plurality of received reflected signals to track the target's location and motion relative to the seeker.

11. The method of claim 10, wherein a number of the plurality of transmitted signals is four.

* * * * *